T. Smith,
Bolt Cutter.

Nº 81,697.                    Patented Sep. 1, 1868.

Witnesses:                         Inventor:
Solon C. Kemon                    Thomas Smith
Chas. A. Pettit                    By Munn & Co.
                                   Attorneys.

United States Patent Office.

THOMAS SMITH, OF CALIFORNIA, MISSOURI.

Letters Patent No. 81,697, dated September 1, 1868; antedated August 21, 1868.

IMPROVED COMPOUND TOOL FOR CUTTING AND SHEARING BOLTS.

The Schedule referred to in these Letters Patent and making part of the same.

TO ALL WHOM IT MAY CONCERN:

Be it known that I, THOMAS SMITH, of California, in the county of Moniteau, and State of Missouri, have invented a new and improved Combined Shears and Bolt and Rivet-Cutter; and I do hereby declare the following to be a full, clear, and exact description of the same, sufficient to enable those skilled in the art to which my invention appertains to make use of it, reference being had to the accompanying drawings, forming part of this specification, and in which—

Figure 1:
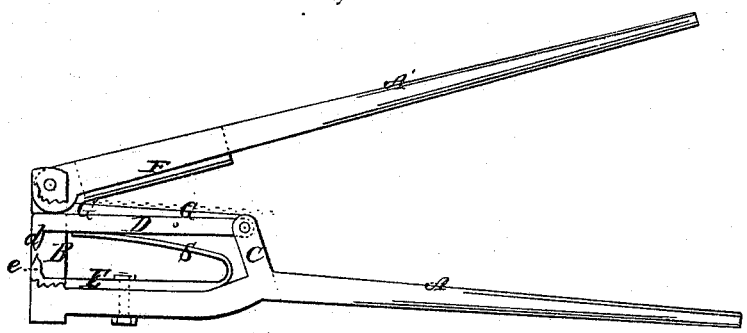

Figure 1 is a side view, and

Figure 2:
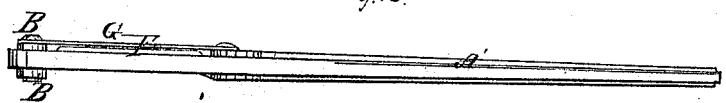

Figure 2 an edge view, of my combined tool.

The object of this invention is to furnish a neat and convenient tool for the use of blacksmiths.

The body of this tool is composed of two arms or handles, A A', connected together by a double standard, B, one end of which is firmly fixed to the end of one arm, A, the end of the other arm, A', being hinged or pivoted between the two posts of the standard at its other extremity.

A pair of lugs, or a double standard, C, projects from the arm A towards the arm A', as shown in fig. 1, serving to support and pivot the end of a movable jaw, D, provided with a cutting-head, d, and extending under and nearly parallel to the arm A', its head working up and down between the two posts of standard B.

A projection, a, upon the end of the arm A', operates to force the cutting-head d down when the arm A' is depressed, and when the latter is raised again, a spring, s, returns the jaw D to its place again.

E is a fixed jaw, bolted to the inner side of the arm A, between the standards B and C, and provided with a cutting-head, e, which rests between the posts of the standard B, the edge projecting up towards the cutting-edge d, and of such dimensions and in such a position that when the arms A A' are brought together as far as they can be, the edges d e will be nearly or quite in contact with each other.

The jaw E and spring S may be formed in one piece, if desired, as shown in the drawings. This forms the bolt and rivet-cutting device.

In combination with the above, I connect the end of the standard C to the end or side of standard B, by means of a stout metallic blade, G, having a cutting-edge along its upper and inner side, and I attach a cutting-blade, F, to the side of the arm A', next to the cutting-blade G. The latter being fixed, and the former movable with the handle A', the two together form a pair of shears sufficiently strong, and operating with sufficient power, to cut with ease any kind of sheet metal.

The whole forms a combined tool which will be very convenient and useful to blacksmiths and others engaged in the manufacture of articles of iron or other metals.

Having thus described my invention, what I claim as new, and desire to secure by Letters Patent, is—

The improved bolt-cutting and shearing-tool herein described.

To the above specification of my improvement I have signed my hand, this sixteenth day of January, 1868.

THOMAS SMITH.

Witnesses:
CHAS. A. PETTIT,
SOLON C. KEMON.